US012705000B2

(12) United States Patent
Agarwal et al.

(10) Patent No.: US 12,705,000 B2
(45) Date of Patent: Aug. 11, 2026

(54) DATA STORAGE DEVICE AND METHOD FOR MAINTAINING A WEIGHTAGE OF COMMANDS IN A PLURALITY OF QUEUE LAYERS

(71) Applicant: Sandisk Technologies, Inc., Milpitas, CA (US)

(72) Inventors: Dinesh Kumar Agarwal, Bangalore (IN); Amit Sharma, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/909,057

(22) Filed: Oct. 8, 2024

(65) Prior Publication Data

US 2026/0099271 A1 Apr. 9, 2026

(51) Int. Cl.
*G06F 3/06* (2006.01)

(52) U.S. Cl.
CPC .......... *G06F 3/0659* (2013.01); *G06F 3/0613* (2013.01); *G06F 3/0679* (2013.01)

(58) Field of Classification Search
CPC .. G06F 13/1642; G06F 12/0246; G06F 3/061; G06F 3/0659; G06F 3/0613; G06F 3/0679
See application file for complete search history.

(56) References Cited

U.S. PATENT DOCUMENTS

| | | | |
|---|---|---|---|
| 6,182,120 B1 | 1/2001 | Beaulieu et al. | |
| 7,626,988 B2 | 12/2009 | Dennison et al. | |
| 7,698,461 B2 | 4/2010 | Cloonan et al. | |
| 7,953,002 B2 | 5/2011 | Opsasnick | |
| 2003/0172104 A1 | 9/2003 | Hooman | |
| 2022/0413719 A1* | 12/2022 | Wu | G06F 3/0625 |
| 2025/0165187 A1* | 5/2025 | Agrawal | G06F 3/0659 |

FOREIGN PATENT DOCUMENTS

| | | | | |
|---|---|---|---|---|
| WO | WO-2018175059 A1 * | 9/2018 | | G06F 3/0659 |

OTHER PUBLICATIONS

Wikipedia, "Flash memory", Aug. 16, 2023, Wikipedia, the revision dated Aug. 16, 2023, pp. 1-38 https://en.wikipedia.org/w/index.php?title=Flash_memory&oldid=1170628435 (Year: 2023).*

Arash Tavakkol, et al., "FLIN: enabling fairness and enhancing performance in modern NVMe solid state drives", 2018, in Proceedings of the 45th Annual International Symposium on Computer Architecture (ISCA '18). IEEE Press, pp. 397-410. https://doi.org/10.1109/ISCA.2018.00041 (Year: 2018).*

S. Bahirat, et al., "Dilaton: Multi-dimensional Quantum Deficit Algorithm for Multi-tenant SSD Resource Allocation," 2024 32nd International Conference on Modeling, Analysis and Simulation of Computer and Telecommunication Systems (MASCOTS), Krakow, Poland, 2024, pp. 1-4 (Year: 2024).*

* cited by examiner

*Primary Examiner* — Curtis James Kortman
(74) *Attorney, Agent, or Firm* — Crowell & Moring LLP

(57) ABSTRACT

A data storage device and method are disclosed for maintaining a weightage of commands in a plurality of queue layers. In one embodiment, a data storage device is provided comprising a non-volatile memory and a plurality of queues. The data storage device determines whether commands received from a plurality of applications in a host can be stored in the plurality of queues according to a defined weightage. If the commands cannot be stored according to the defined weightage, feedback can be provided to a previous queue level and/or to the host to take corrective action. Other embodiments are provided.

10 Claims, 11 Drawing Sheets

STORAGE
MODULE
200
TO HOST
202
STORAGE
CONTROLLER
204
102
CONTROLLER
102
CONTROLLER
102
CONTROLLER
100
100
100
104
NVM
104
NVM
104
NVM

DATA STORAGE DEVICE AND METHOD FOR MAINTAINING A WEIGHTAGE OF COMMANDS IN A PLURALITY OF QUEUE LAYERS

BACKGROUND

A data storage device can comprise a plurality of queues that are organized in a plurality of layers or levels. The queues can store read and/or write commands received from a plurality of applications in the host. The top-most queue layer can be exposed to the host, and the host can define the weightage of each application's commands in the queue. In a data storage device having a non-volatile memory with a plurality of memory dies and memory planes, subsequent queue layers can comprise a die queue and a plane queue.

DETAILED DESCRIPTION

Figures 1A, 1B:
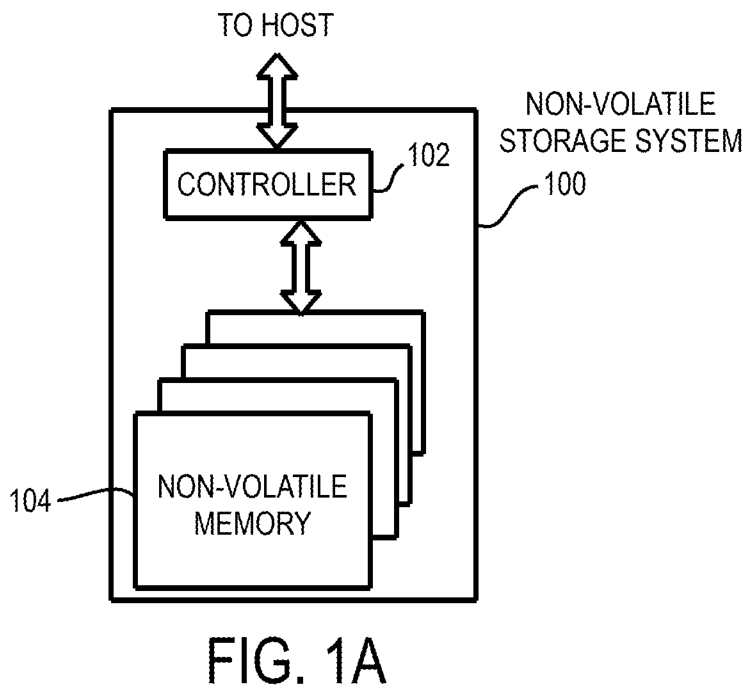
FIG. 1A is a block diagram of a data storage device of an embodiment.
FIG. 1B is a block diagram illustrating a storage module of an embodiment.

The following embodiments generally relate to a data storage device and method for maintaining a weightage of various applications in variable queue scenarios for each layer and providing feedback to a previous layer or to a host for corrective action. In one embodiment, a data storage device is provided comprising a non-volatile memory, a plurality of queues comprising a first queue and a second queue, and one or more processors. The one or more processors, individually or in combination, are configured to: store, in the first queue, commands received from a plurality of applications in a host to access the non-volatile memory, wherein the commands are stored in the first queue according to a defined weightage among the plurality of applications; determine whether the commands can be transferred from the first queue and stored in the second queue according to the defined weightage; and in response to determining that the commands cannot be transferred from the first queue and stored in the second queue according to the defined weightage, select at least one additional command from at least one of the plurality of applications for storage in the second queue so that the defined weightage is maintained.

In some embodiments, the one or more processors, individually or in combination, are further configured to: determine whether the defined weightage is maintained in a last queue of the plurality of queues; and in response to determining that the defined weightage is not maintained in the last queue, send feedback to the host to take a corrective action.

In some embodiments, the corrective action comprises changing a weightage for storing commands in the first queue, so that the defined weightage is maintained in the last queue.

In some embodiments, the corrective action comprises changing a rate at which at least one of the plurality of applications generates commands.

In some embodiments, the corrective action comprises reducing a fragmentation range for at least one of the plurality of applications.

In some embodiments, the corrective action comprises causing at least one of the plurality of applications to align data to increase parallelism.

In some embodiments, the corrective action comprises changing a command length.

In some embodiments, a queue interface for the first queue is exposed to the host.

In some embodiments, the plurality of queues comprises a die queue and a plane queue.

In some embodiments, the memory comprises a plurality of memory dies.

In some embodiments, the memory comprises a three-dimensional memory.

In another embodiment, a method is provided that is performed in a data storage device comprising a plurality of queue layers. The method comprises: determining whether commands received from a plurality of applications in a host can be stored in each of the plurality of queue layers according to a defined ratio; and in response to determining that the commands received from the plurality of applications in the host cannot be stored in each of the plurality of queue layers according to the defined ratio, taking an action so that the commands received from the plurality of applications in the host are stored in each of the plurality of queue layers according to the defined ratio.

In some embodiments, the action comprises providing feedback to a previous queue layer to provide at least one additional command from at least one of the plurality of applications to achieve the defined ratio.

In some embodiments, the action comprises providing a request to the host for a corrective action.

In some embodiments, the corrective action comprises changing a weightage for storing commands in a first queue layer.

In some embodiments, the corrective action comprises changing a rate at which at least one of the plurality of applications generates commands.

In some embodiments, the corrective action comprises reducing a fragmentation range for at least one of the plurality of applications.

In some embodiments, the corrective action comprises causing at least one of the plurality of applications to align data to increase parallelism.

In some embodiments, the corrective action comprises changing a command length.

In another embodiment, a data storage device is provided comprising: a plurality of queue levels; and means for: determining whether commands received from a plurality of applications in a host can be stored in one of the plurality of queue levels according to a defined weightage; and in response to determining that the commands received from the plurality of applications in the host cannot be stored in the one of the plurality of queue levels according to the defined weightage, providing feedback to a previous queue level and/or to the host to cause the commands received from the plurality of applications in the host to be stored in the one of the plurality of queue levels according to the defined weightage.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1C:
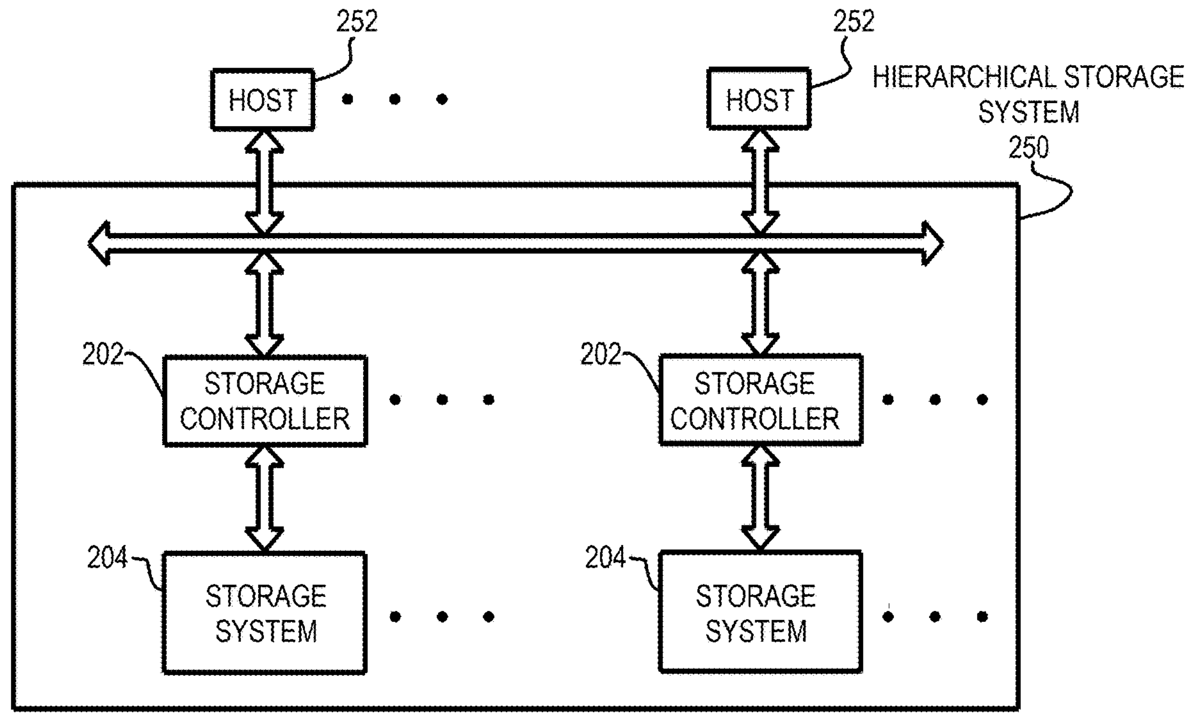
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
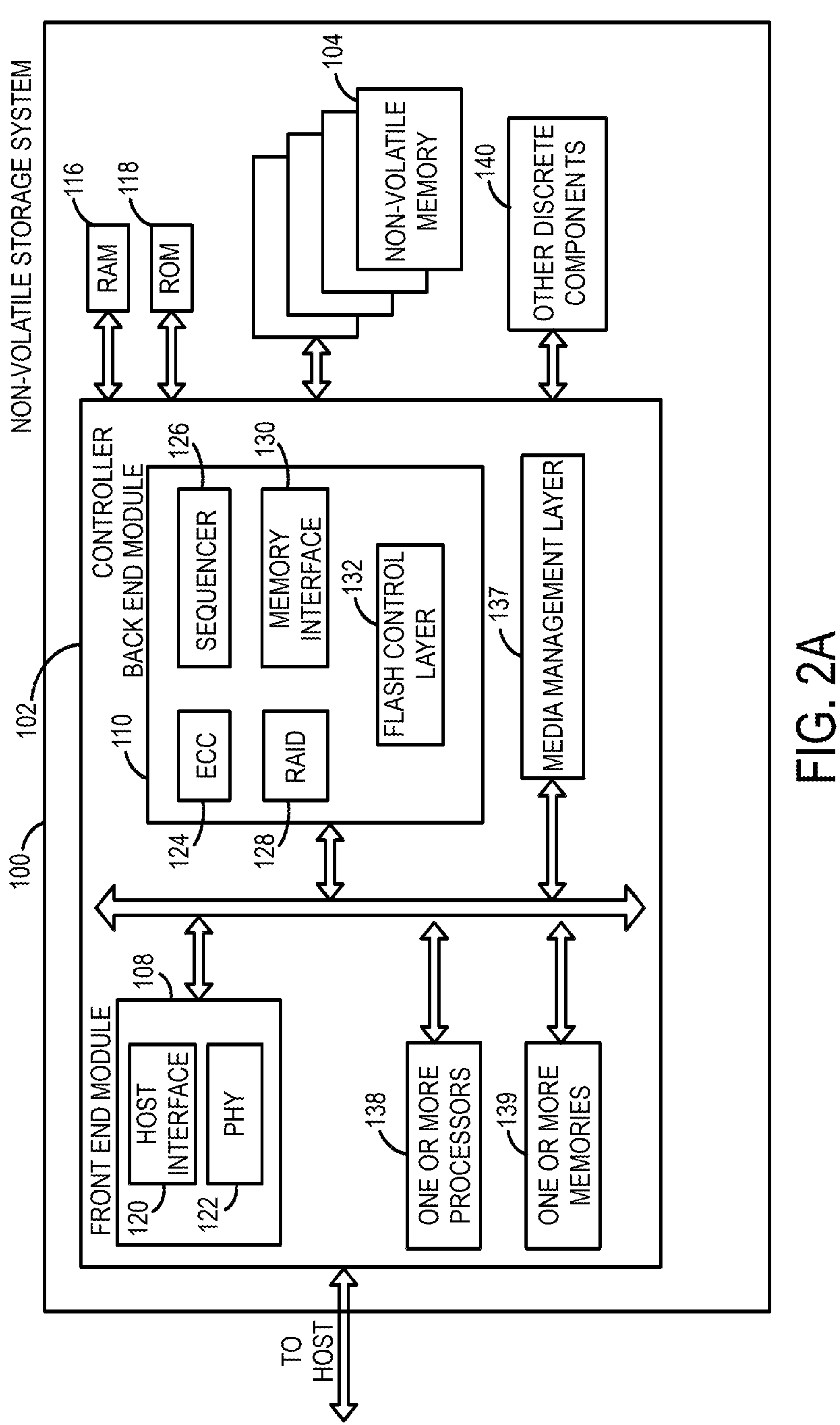
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR)

interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
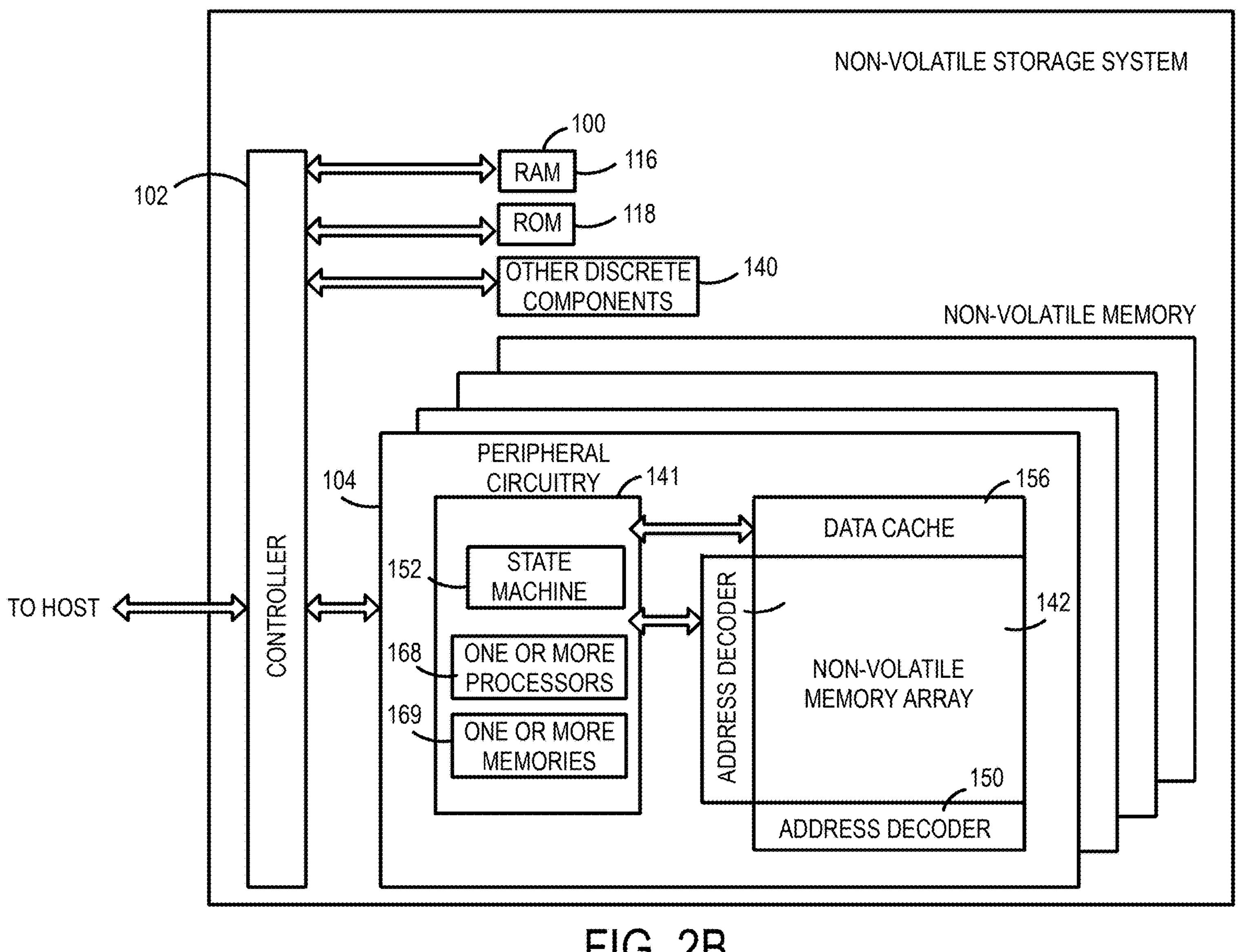
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
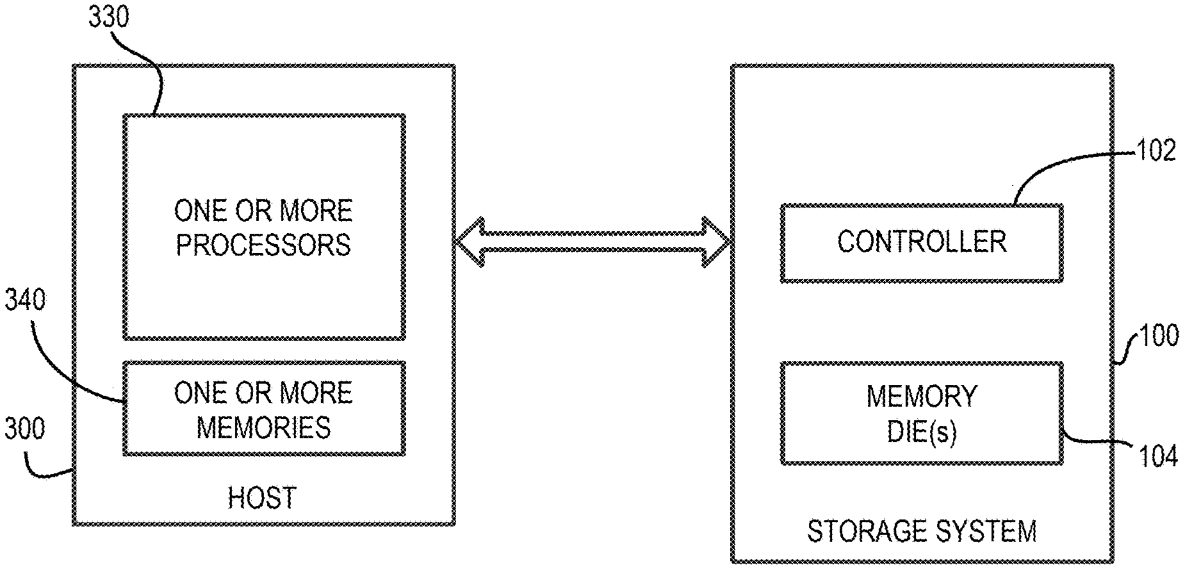
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 4:
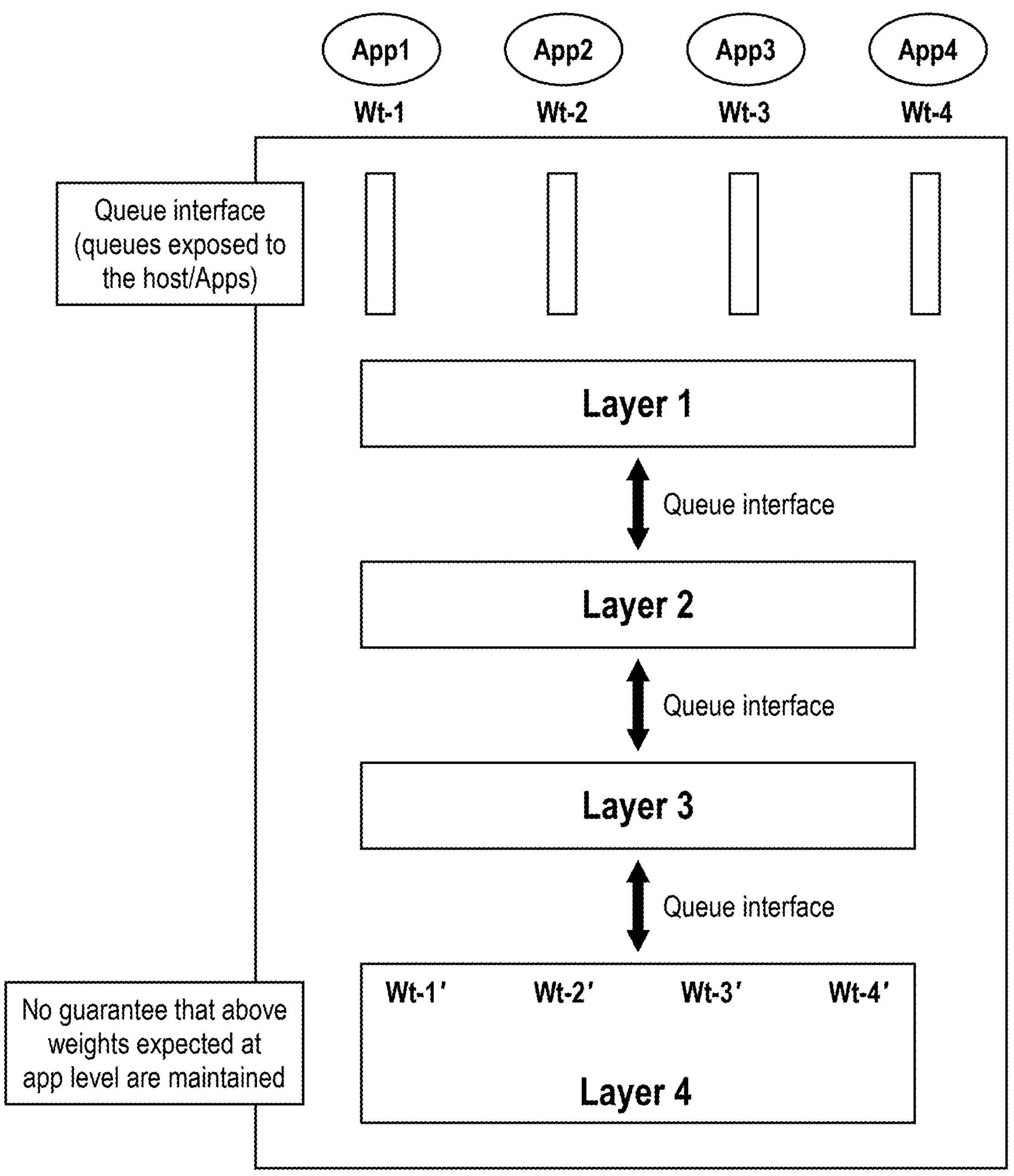
FIG. 4 is a block diagram of a data storage device of an embodiment having a plurality of queue layers.
Figure 5:
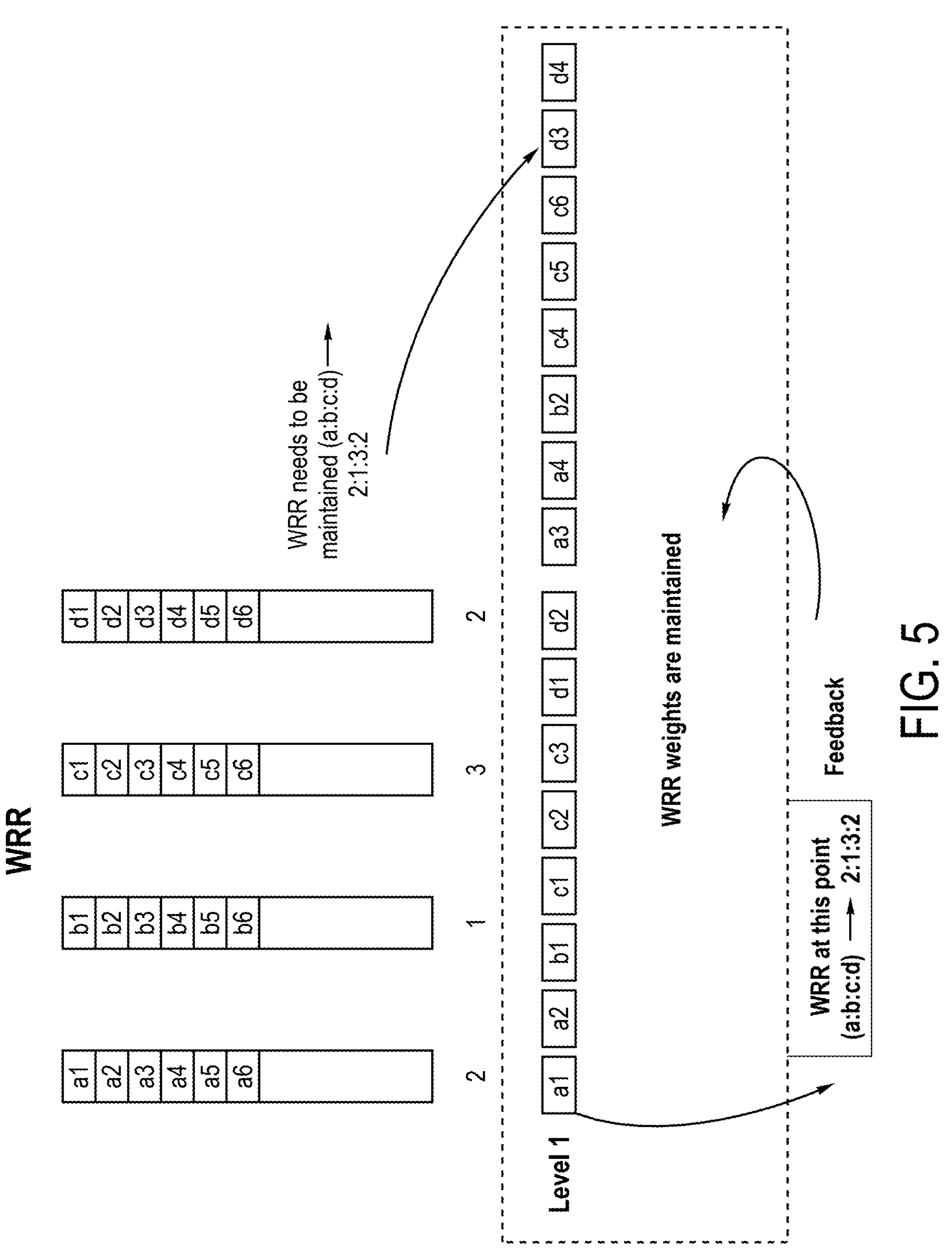
FIG. 5 is a block diagram of queues of an embodiment in which a command weightage is maintained.

As shown in FIG. 4, the data storage device 100 can comprise a plurality of queues (e.g., in one or more volatile memories in the data storage device 100), which can be organized in a plurality of layers (which will sometimes be referred to herein as levels). The queues can store read and/or write commands (which may be referred to herein as "host commands" or "memory access commands") received from a plurality of applications in the host 300. The Layer 1 queue can be exposed to the host 300, and the host 300 can define how these commands from various ones of the host applications are stored in the Layer 1 queue. This is sometimes referred to herein as "weightage." In the example shown in FIG. 5, a weighted round-robin (WRR) scheme is defined by the host 300, such that host commands transferred from a command queue (shown at the top of FIG. 5), which can be located in the host 300 or the data storage device 100, to the Level 1 queue in a 2:1:3:2 ratio (i.e., two commands from application a, one command from application b, three commands from application c, and two commands from application d).

Figure 6:
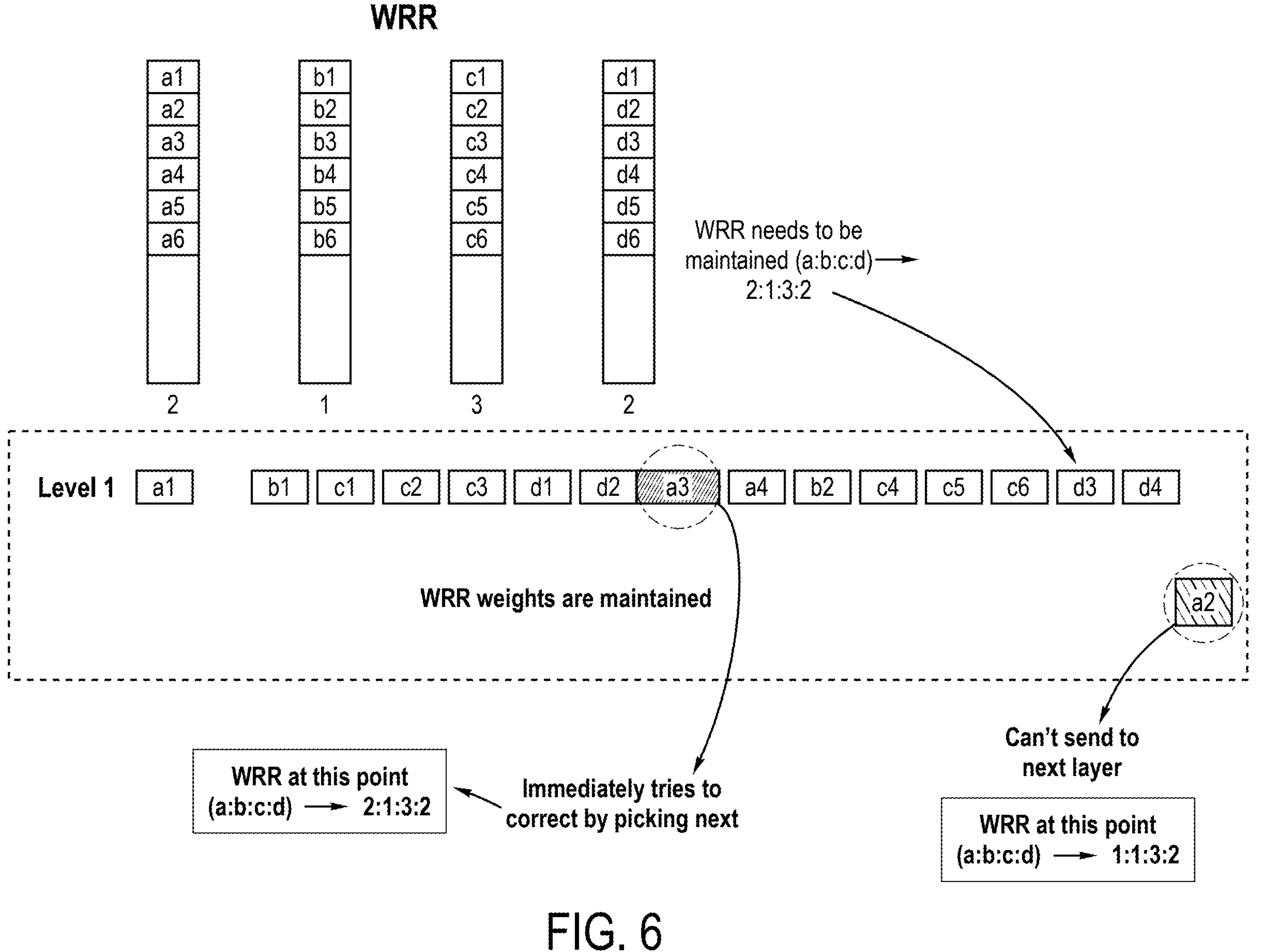
FIG. 6 is a block diagram of queues of an embodiment in which a command weightage is not maintained at a subsequent queue level.

The controller 102 of the data storage device 100 can confirm that the host commands are stored in the Level 1 queue according to the host-defined weightage. If the controller 102 determines that the host commands are not stored according to the host-defined weightage, the controller 102 can perform a self-correction operation by selecting the appropriate host command(s) from the command queue to result in the correct weightage. For example, as shown in FIG. 6, if a command from application a (command a2) cannot be transferred from the command queue to the Level 1 queue for whatever reason, the controller 102 can perform a self-correction operation by selecting another command from application a (command a3), so that application a's weighing in the Level 1 queue is maintained.

However, when host commands are transferred from one queue level to another, the host-defined weightage may not be maintained. Consider, for example, an architecture in which the non-volatile memory 104 comprises a plurality of memory dies, where each memory die comprises a plurality of planes and the one or more memory dies and one or more planes can be read/written in parallel. In this architecture, host commands initially stored in the Level 1 queue can be transferred to a Level 2 queue (e.g., a die queue) and from there to a Level 3 queue (e.g., a plane queue). In some situations, when host commands are transferred from one level to another, the commands may not be stored in the same weightage as in the top-most queue layer. For instance, in the example shown in FIG. 6, when the host commands that stored in the Level 1 queue are transferred to the Level 2 queue, command a2 will not be sent to that next queue layer (e.g., because the logical-to-physical translation information is not available for that command). As a result, the weightage in the next queue layer will be 1:1:3:2 instead of 2:1:3:2.

So, even if the data storage device 100 maintains the host-defined weightages at the top-most queue layer, there is no guarantee that weightage will be maintained throughout as the commands are transferred to subsequent queues. To address this, a self-correction mechanism can be used to provide feedback to a previous layer to handle variable queues scenarios by attempting to maintain weights at each queue layer. In this embodiment, each layer tries to maintain the weights specified by the top-most layer and passes feedback to the previous, upper layer if weights cannot be maintained to take corrective action to correct the same. It should be noted that actions ascribed to the queues (e.g., one queue providing feedback to another queue, and that other queue taking a corrective action) can be performed by the controller 102 (e.g., one or more processors, individually or in combination).

Figure 7:
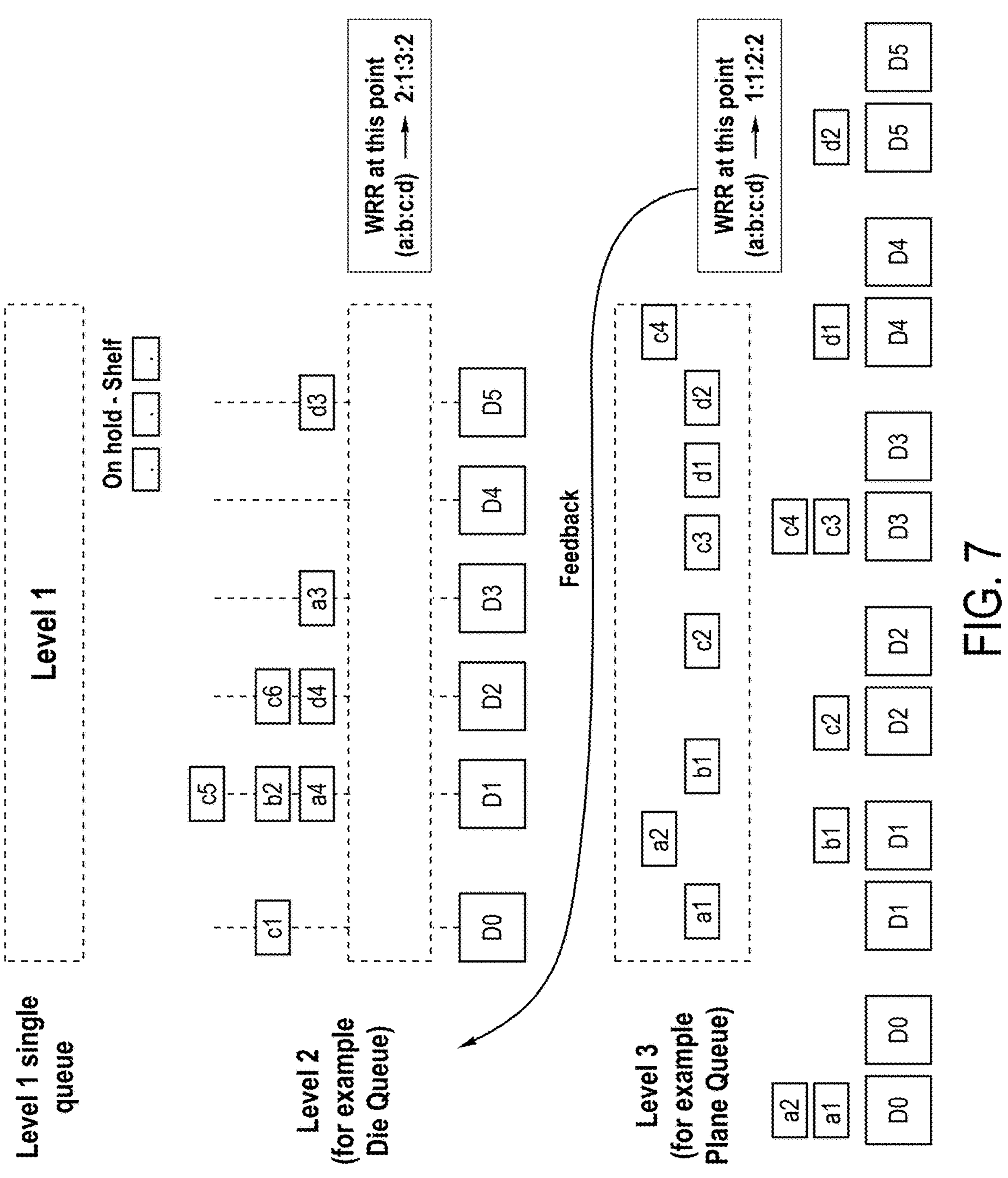
FIG. 7 is a block diagram of queues of an embodiment in which feedback is provided to a previous queue.

This is illustrated in the example shown in FIG. 7. In this example, the Level 1 and Level 2 queues are able to maintain the host-defined weights, but the weightage is not maintained when the commands are transferred to the Level 3 queue (e.g., because of narrow-to-wide (die-to-plane) queue conversion or another issue). As such, some commands will be executed in parallel, while other commands are left behind. This layer can attempt to self-correct if additional commands are available. However, if this is unsuccessful, information can be passed to the previous, upper queue layer to take corrective action to send more commands related to a certain application (here, application a).

Figure 8:
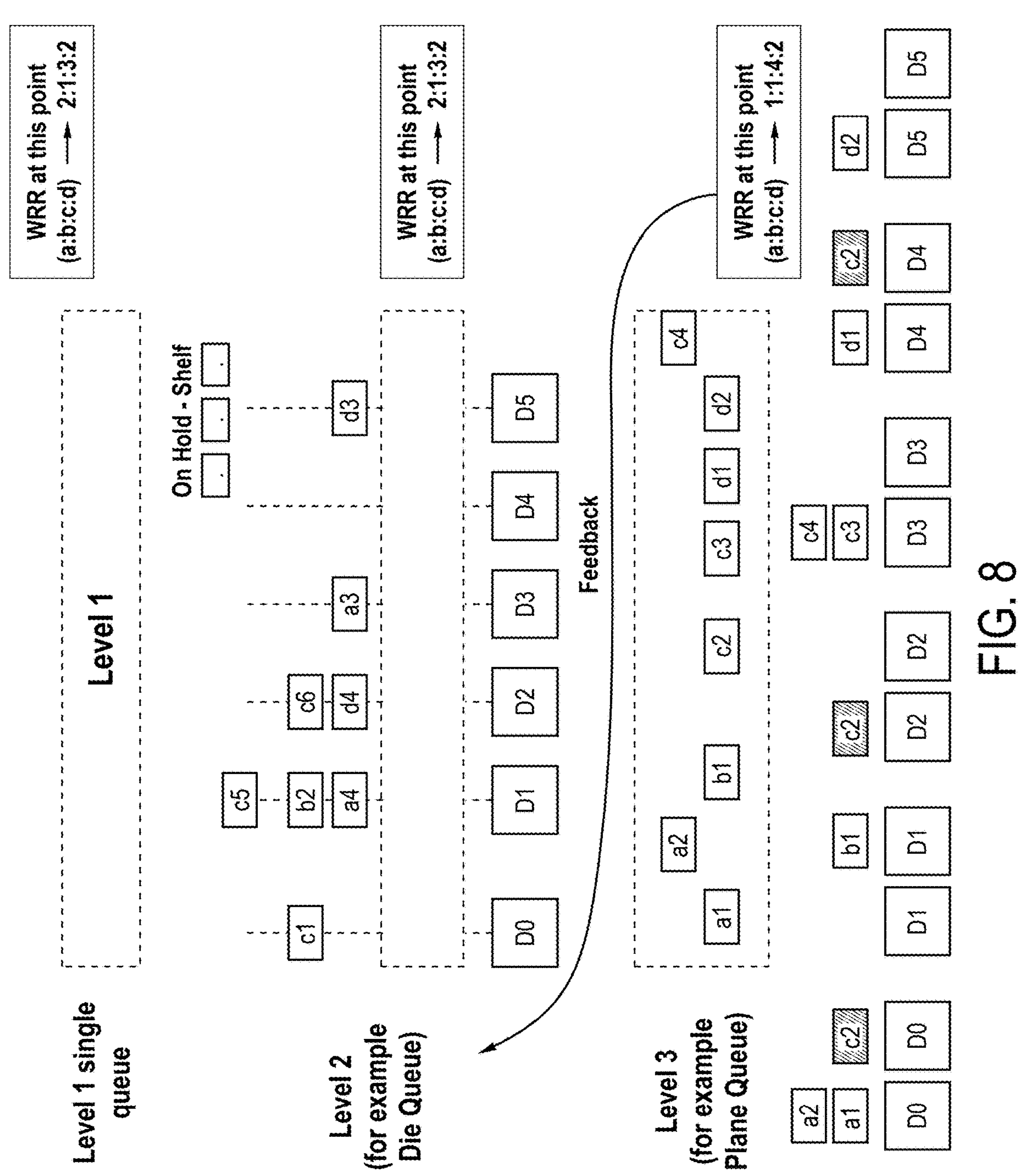
FIG. 8 is a block diagram of queues of an embodiment in which feedback is provided to a previous queue.

As shown in FIG. 8, in one embodiment, overall parallel processing is accounted for to determine how much parallelism is achieved, and that information can be updated based on modified weights to take corrective measures. In situations where command length can vary, some commands achieve occupancy on a higher number of queues when a long command is split, and some commands achieve a lower occupancy even after consuming more queues due to fragmentation.

Figure 9:
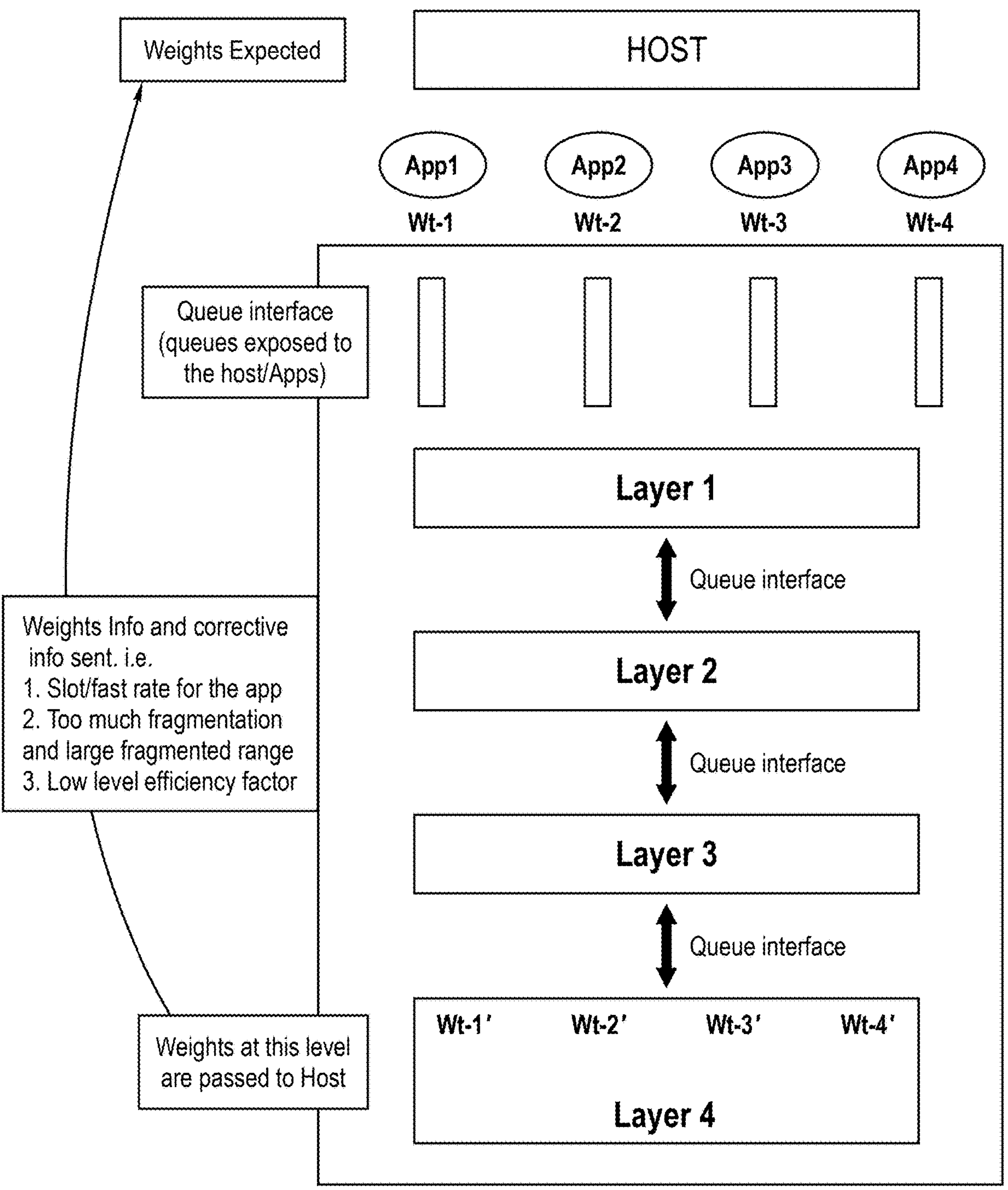
FIG. 9 is a block diagram of queues of an embodiment in which feedback is provided to a host.

Eventually, if the final weights (the weights at the lower-most queue) do not match the host-defined weightage, feedback can be passed to the host 300 for correction action to be taken. This embodiment is illustrated in the example shown in FIG. 9. In this embodiment, a feedback mechanism is used to pass feedback to the host 300, in response to which the host 300 can take corrective action to help ensure that the host-defined weightage is maintained as commands are transferred to subsequent queues. Any suitable corrective action can be taken. For example, the host 300 can adjust the slot/fast rate for an application if the commands available are less in a given time or if too many commands are being accumulated. This cover rates as well parallelism using queue depth.

As another example, the host 300 can adjust the fragmentation range covered by the commands. A large fragmented range can cause the controller 102 of the data storage device 100 to not keep up with the required weights as extra work needs to be done to achieve the weightage (e.g., loading many control pages, performing consolidation, etc.). Reducing the fragmented range can reduce this work and, hence, help ensure the desired weightage is met. As yet another example, the host 300 can increase an efficiency factor of the commands. Commands are inefficient if parallelism is wasted due to various factors, such as unalignment or scattered data to the various memory location or ordering requirements due to overlapping commands. Making the commands more efficient can increase parallelism and, hence, help ensure the desired weightage is met. It should be noted that these are merely examples and that other corrective actions can be taken.

There are several advantages associated with these embodiments. For example, these embodiments can be used to maintain the true weights at each queue layer, down to the final queue layer, to the best possible extent to meet the host-defined weightage by taking corrective actions at each layer if weights are not maintained and passing the feedback to upper layers accordingly. Feedback can be provided to the host 300 of the weightage at the final queue layer, and the host 300 can take correction action based on that feedback.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:

a host interface configured to communicate with a host;

a non-volatile memory;

a plurality of queues comprising a first queue and a second queue; and one or more processors, individually or in combination, configured to:

receive, via the host interface, commands received from a plurality of applications in the host;

store, in the first queue, the commands received from the plurality of applications in the host to access the non-volatile memory, wherein the commands are stored in the first queue according to a defined weightage among the plurality of applications;

determine whether the commands can be transferred from the first queue and stored in the second queue according to the defined weightage;

in response to determining that the commands cannot be transferred from the first queue and stored in the second queue according to the defined weightage, select at least one additional command from at least one of the plurality of applications for storage in the second queue so that the defined weightage is maintained;

determine whether the defined weightage is maintained in a last queue of the plurality of queues;

in response to determining that the defined weightage is not maintained in the last queue, send feedback to the host to take a corrective action, wherein the corrective action comprises changing a weightage for storing commands in the first queue so that the defined weightage is maintained in the last queue, reducing a fragmentation range for at least one of the plurality of applications, causing at least one of the plurality of applications to align data to increase parallelism, or changing a command length; and after taking the corrective action, execute commands stored in the last queue in parallel in the non-volatile memory.

2. The data storage device of claim 1, wherein a queue interface for the first queue is exposed to the host.

3. The data storage device of claim 1, wherein the plurality of queues comprises a die queue and a plane queue.

4. The data storage device of claim 1, wherein the memory comprises a plurality of memory dies.

5. The data storage device of claim 1, wherein the memory comprises a three-dimensional memory.

6. A method comprising:

performing in a data storage device comprising a non-volatile memory, a plurality of queues comprising a first queue and a second queue, and a host interface configured to communicate with a host:

receiving, via the host interface, commands received from a plurality of applications in the host;

storing, in the first queue, the commands received from the plurality of applications in the host to access the non-volatile memory, wherein the commands are stored in the first queue according to a defined weightage among the plurality of applications;

determining whether the commands can be transferred from the first queue and stored in the second queue according to the defined weightage;

in response to determining that the commands cannot be transferred from the first queue and stored in the second queue according to the defined weightage, selecting at least one additional command from at least one of the plurality of applications for storage in the second queue so that the defined weightage is maintained;

determining whether the defined weightage is maintained in a last queue of the plurality of queues;

in response to determining that the defined weightage is not maintained in the last queue, sending feedback to the host to take a corrective action, wherein the corrective action comprises changing a weightage for storing commands in the first queue so that the defined weightage is maintained in the last queue, reducing a fragmentation range for at least one of the plurality of applications, causing at least one of the plurality of applications to align data to increase parallelism, or changing a command length; and after taking the corrective action, executing commands stored in the last queue in parallel in the non-volatile memory.

7. The method of claim 6, wherein a queue interface for the first queue is exposed to the host.

8. The method of claim 6, wherein the plurality of queues comprises a die queue and a plane queue.

9. The method of claim 6, wherein the memory comprises a plurality of memory dies.

10. The method of claim 6, wherein the memory comprises a three-dimensional memory.

* * * * *